Patented July 23, 1946

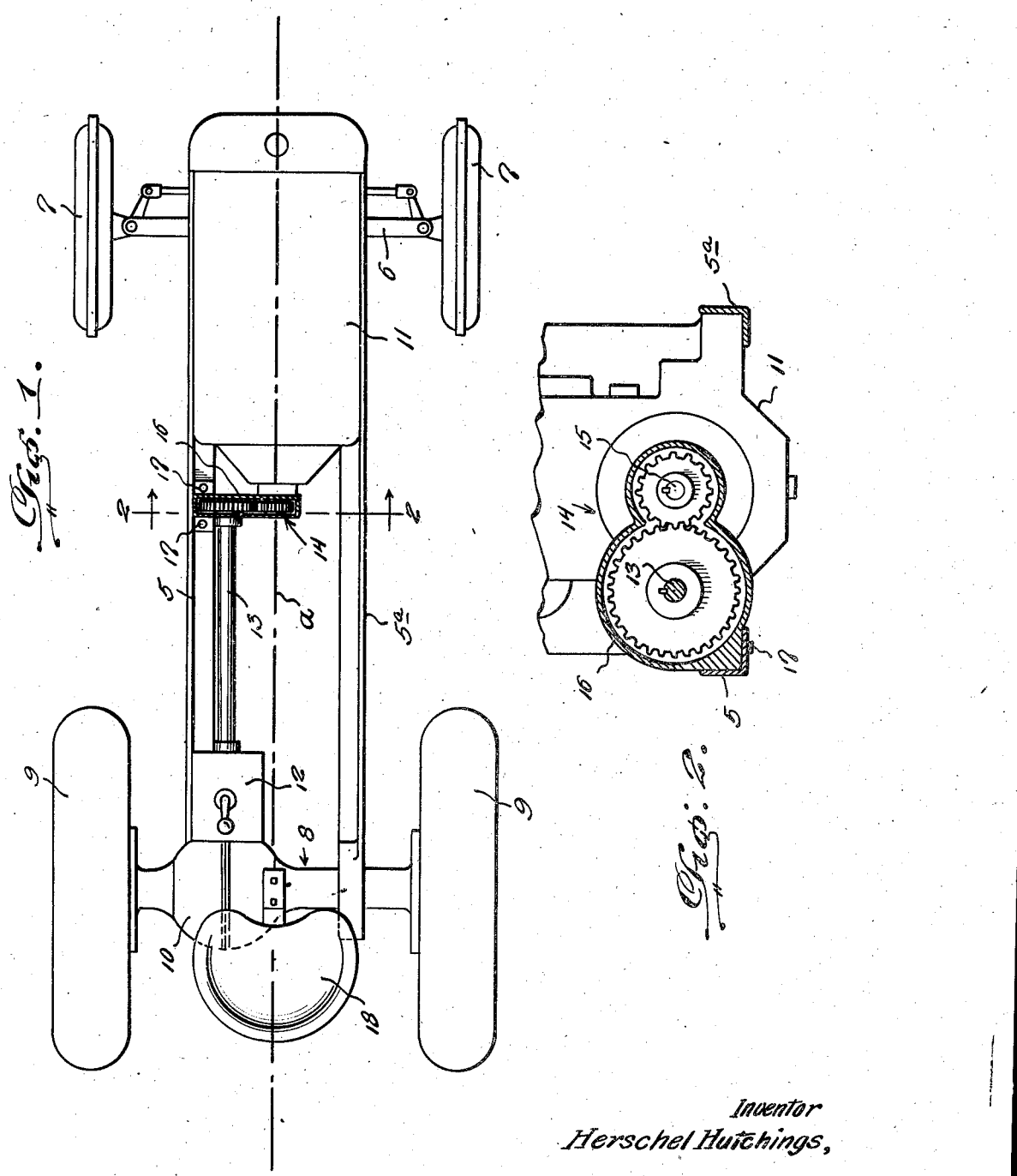

2,404,442

UNITED STATES PATENT OFFICE 2,404,442

AGRICULTURAL TRACTOR

Herschel Hutchings, Lubbock, Tex.

Application April 17, 1945, Serial No. 588,775

1 Claim. (Cl. 180—1)

This invention relates to an improved agricultural tractor of that kind wherein provision is made so that the operator may be situated in a position from whence he may view the ground between and immediately ahead of the tractor rear wheels.

Heretofore, tractors of the above kind have been of the frameless type including a body supported on a rear axle housing structure and offset to one side of the longitudinal center line of the tractor proper, and an operator's seat supported on the rear axle housing structure and located to the other side of the center line. This type of construction, besides being complicated, only permits a view of the ground to the latter side of the center line immediately ahead of the rear wheels.

The primary object of the present invention, therefore, is to provide a tractor of simple construction embodying an open frame supporting a power plant at its forward end centrally between the front tractor wheels a rear axle housing structure supporting the rear end of the frame and including a differential assembly offset to one side of the longitudinal center line of the tractor, a transmission assembly secured to the differential assembly and the adjacent side of the frame and offset to said one side of the center line, a longitudinally disposed propeller shaft offset to said one side of the center line and directly connected at its rear end to the drive shaft of the transmission assembly, a gearing assembly operatively connecting the forward end of the propeller shaft with the drive shaft of the power plant and offset laterally to said one side of the center line, and an operator's seat supported on the rear axle housing structure centrally between the rear tractor wheels, whereby the operator may view the ground directly along said center line immediately ahead of the rear wheels.

The exact nature of the present invention will become apparent from the following description when considered in connection with the accompanying drawing.

In the drawing:

Figure 1 is a view partly in top plan and partly in horizontal section, of a tractor embodying the present invention.

Figure 2 is an enlarged transverse section taken on line 2—2 of Figure 1.

Referring in detail to the drawing, the illustrated form of the present tractor includes side frame rails 5 and 5a, and supported at their forward ends on a front axle 6 having front steering and supporting wheels 7 and supported at their rear ends by a rear axle housing structure 8 including a pair of transversely spaced rear drive wheels 9 and a differential assembly 10 offset to one side of the longitudinal center line a of the tractor proper. A power plant 11 is supported by the forward ends of frame rails 5 and 5a centrally between the wheels 7, and a transmission assembly 12 is secured to the differential assembly 10 and the adjacent side frame rail 5 said transmission assembly being offset laterally to said one side of the center line a and operatively associated with the assembly 10. A longitudinal propeller shaft 13 is offset to said one side of the center line a and has its rear end directly connected to the drive shaft of the transmission assembly 12.

A gearing assembly 14 operatively connects the forward end of propeller shaft 13 with the drive shaft 15 of power plant 11 and is offset laterally to said one side of the center line a. The assembly 14 includes a casing 16 secured at 17 to rail 5.

An operator's seat 18 is supported on the structure 8 centrally between the rear tractor wheels 9, and it will be apparent that the operator may view the ground directly along the center line a between the rails 5 and 5a immediately ahead of the rear wheels 9.

The construction is comparatively simple, avoids the need for a complicated body construction, and effectively provides for center vision or view of the ground along the center line a between the power plant and the rear axle housing structure.

Minor changes may be made in the specific construction shown and described, such as fall within the scope of the invention as claimed.

What I claim is:

An agricultural tractor including an open frame having side rails and provided with front steering and supporting wheels, a power plant supported by the forward end of the frame centrally between said wheels, a rear axle housing structure supporting the rear end of the frame and including rear drive wheels and a differential assembly offset to one side of the longitudinal center line of the tractor, a transmission assembly secured to the differential assembly and offset to said one side of said center line and mounted on the adjacent side rail of the frame, a longitudinal propeller shaft offset to said one side of the center line and connected at its rear end to the drive shaft of said transmission assembly, and a gearing assembly offset to said one side of the center line and mounted on said adjacent side rail, said gearing assembly operatively connecting the front end of the propeller shaft to the power plant, and a driver's seat at the rear of the tractor, the space between the power plant and the rear axle housing structure and between the propeller shaft and the other side rail of the frame being substantially unobstructed so that the driver has substantially complete vision downwardly therethrough to observe the passage of plants beneath the tractor.

HERSCHEL HUTCHINGS.